United States Patent [19]

Kehoe et al.

[11] 4,357,354

[45] * Nov. 2, 1982

[54] REDUCED CALORIE CHEWING GUM

[75] Inventors: Gary Kehoe, Greenwich, Conn.; Wayne J. Puglia, Bellerose Village; Frank Witzel, Saratoga Springs, both of N.Y.; Dominick R. Friello, Danbury, Conn.; Donald A. M. Mackay, Pleasantville, N.Y.

[73] Assignee: Nabisco Brands, Inc., New York, N.Y.

[*] Notice: The portion of the term of this patent subsequent to Feb. 24, 1998, has been disclaimed.

[21] Appl. No.: 210,200

[22] Filed: Nov. 25, 1980

[51] Int. Cl.$^3$ .................... A23G 3/30; A23L 1/236
[52] U.S. Cl. ............................ 426/3; 426/5; 426/804; 426/548
[58] Field of Search .......................... 426/3-6

[56] References Cited

U.S. PATENT DOCUMENTS

| | | | |
|---|---|---|---|
| 2,301,331 | 6/1940 | Schantz | 426/3 |
| 2,438,551 | 3/1948 | Fenimore | 426/3 |
| 2,525,072 | 10/1950 | Kearby | 426/3 |
| 3,666,492 | 5/1972 | Teng et al. | 426/3 |
| 4,208,431 | 6/1980 | Friello | 426/3 |
| 4,217,368 | 8/1980 | Witzel et al. | 426/5 |
| 4,248,894 | 2/1981 | Mackay et al. | 426/3 |
| 4,252,830 | 2/1981 | Kehoe | 426/3 |

*Primary Examiner*—Jeanette M. Hunter
*Attorney, Agent, or Firm*—Richard Kornutik

[57] ABSTRACT

A reduced calorie chewing gum is provided which does not decrease in viscosity upon chewing and contains less than 65% water-solubles, such as sugars and/or sugar alcohols such as sweeteners, and includes gum base containing high levels of inert fillers, such as calcium carbonate or talc in amounts of at least about 40% by weight, softeners, such as lecithin, and optionally synthetic non-caloric sweeteners, such as aspartame, saccharin, or cyclamates. The chewing gum includes at least about 10% air voids entrapped in the gum base matrix which, upon chewing, become filled with moisture causing a dramatic increase in cud volume.

16 Claims, No Drawings

REDUCED CALORIE CHEWING GUM

The present invention relates to a reduced calorie chewing gum which includes a chewable gum base containing flavoring, inert fillers or texturizing agents in amounts of at least about 40% by weight up to 80% or more, and softeners and as a sweetener one or more sugars and/or sugar alcohols in amounts to impart desired sweetness characteristics to the chewing gum while keeping the calorie content of the gum to at least only two-thirds of that of conventional sugar-containing or sugar alcohol containing chewing gum. The chewing gum may also optionally include non-caloric sweeteners to further enhance the sweetness of the gum without contributing to caloric content or imparting metallic or bitter aftertaste.

The gum base employed includes at least about 10% air voids entrapped therein and created during the manufacturing process, which voids are filled with water upon chewing causing a dramatic increase in cud volume of the gum base so that initially only small pieces of chewing gum need be chewed.

Sugarless chewing gums presently marketed include a major portion of water-solubles in the form of sugar alcohols, such as sorbitol and/or mannitol and/or xylitol, as sugar and corn syrup substitutes. While the sugarless chewing gums may be classified as non-cariogenic, they are not non-caloric. The sugar alcohols have the same caloric content as carbohydrates so that sugarless gum containing sugar alcohols have about the same caloric content as sugar-containing gums.

The sugar-containing gums contain major portions of water-solubles in the form of corn syrup as a softener or plasticizer and sugars, such as sucrose, dextrose and/or fructose. These materials, which are carbohydrates, have a caloric value of approximately 4 calories per gm.

Upon chewing of either the sugarless or sugar-containing chewing gums, the water-solubles which make up a major portion of the gum, for example, 75% or more, are consumed thereby causing the viscosity of the gums of decrease rapidly and the cud volume to shrink.

The above viscosity and cud volume problems could conceivably be resolved by formulating a chewing gum made primarily of conventional chewing gum base. However, it has been found that conventional gum base, which contains less than 2% air voids, is initially extremely hard and therefore too difficult to chew at first.

Accordingly, it is apparent that a need exists in the market place for a chewing gum which has a sweetness comparable to that of conventional sugar-containing chewing gums and sugarless chewing gums containing sugar alcohols, such as sorbitol but yet has a substantially lower calorie content than such conventional chewing gums.

In accordance with the present invention, a chewing gum is provided which is initially soft and chewable, has reduced calorie content and yet has a desirable sweetness level, and does not decrease in viscosity or shrink upon chewing, but, in fact, expands or swells and remains soft upon prolonged chewing. The chewing gum of the invention will have a calorie content of less than 65% and preferably less than 50% of that of conventional sugar-containing and sugarless chewing gums with sweetness comparable to such gums.

The reduced calorie chewing gum composition of the invention contains gum base which includes at least about 10%, and preferably from about 12 to about 18% air voids entrapped in the gum base matrix and has a density ranging from about 1.5 to about 1.75 gm/cc, and preferably from about 1.63 to about 1.67 gm/cc, and further includes at least 40% by weight of one or more inert fillers and/or texturizers and from about 1 to about 30% by weight of a sugar and/or from about 1 to about 30% by weight of a sugar alcohol or mixtures thereof, as well as synthetic non-caloric sweeteners, other flavors and softeners and other conventional, substantially calorie-free or calorie-containing ingredients.

Conventional chewing gum includes a large proportion of plasticizers and softeners which are exemplified by corn syrup. These high calorie components are replaced by the substantially calorie-free fillers and texturizing agents which impart the desired softness and texture to the chewing gum base, as will be seen hereinafter.

The gum base employed in the chewing gum of the invention is initially soft partly due to the relatively large volume of air voids and remains soft. Upon chewing, the gum base does not increase in viscosity, cud volume loss is minimized, and, in fact, air voids within the gum base matrix are filled with saliva thereby causing the cud to swell. Moreover, collection of saliva in the air voids minimizes hydration of the gum base thereby preventing the cud from becoming undesirably soft and inhibiting loss of cohesivity upon chewing.

In some respects, the gum base employed herein is more similar to conventional chewing gum in chewing characteristics than to gum base even though it essentially contains only gum base ingredients, sweetener and other flavors. The reason for this is the large volume of air trapped in the gum base, for example at least about 15% trapped air, while conventional chewing gum contains from 10 to 13% trapped air, and chewing gum base contains only 1 to 3% trapped air. However, the air voids present in the gum base present in the chewing gum of the invention become filled with moisture, upon chewing, resulting in a cud volume increase of 100% or more. In contrast, chewing of conventional chewing gum results in a cud volume loss of from 5 to 15%.

The chewing gum of the invention includes a relatively water-insoluble, non-digestable, substantially calorie-free gum base.

As indicated, the fillers and/or texturizing agents are essential components of the gum base. The fillers and texturizing agents are present in an amount of at least about 40%, and preferably ranging from about 45 to about 85% by weight, and more preferably from about 50 to about 85% by weight, and most preferably from about 55 to about 80% by weight of the gum base. Examples of such substantially calorie-free insoluble non-extractable fillers and/or texturizing agents suitable for use herein include, but are not limited to, calcium carbonate, aluminum hydroxide, alumina, magnesium carbonate, dicalcium phosphate, talc ($3MgO.4SiO_2.H_2O$), magnesium trisilicate, magnesium hydroxide, aluminum silicates and combinations thereof. Mild abrasives for tooth cleaning or plaque reduction may also be employed without fear of undesirable extraction.

The above fillers and/or texturizing agents will remain in the gum base without significant release, even after chewing for hours.

Other typical examples of the ingredients found in the chewing gum base include masticatory substances of synthetic origin, such as styrene-butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 1 to about 5%, preferably from about 1 to about 3%, and optimally from about 1.5 to about 2.5% by weight of chewable gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum. However, other solvents may be employed, such as pentaerythritol ester gum, polymerized ester gum, and ester gum. The solvent will be employed in an amount ranging from about 2 to about 6%, preferably from about 3 to about 4.5%, and optimally from about 3.75 to about 4.25% by weight of the gum base.

The gum base may also include a hydrophilic-type detackifier which will sorb saliva and become slippery and is incompatible with the elastomer and solvent for the elastomer. Examples of such materials suitable for use herein will include vinyl polymers having a molecular weight within the range of from about 2000 to about 10,000 or more, such as polyvinyl acetate, polyvinyl butyl ether, copolymers of vinyl esters and vinyl ethers.

The hydrophilic-type detackifier will be employed in an amount within the range of from about 3 to about 7.5% by weight of the gum base, preferably from about 4 to about 6.5% and optimally from about 4.75 to about 5.25% of the gum base.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like. The hard waxes will be employed in an amount within the range of from about 0 to about 7% by weight of the gum base, preferably from about 3 to about 5%, and optimally from about 3.75 to 4.5% by weight. The preferred hard waxes are candelilla wax and paraffin wax employed in combination so that from 0.75 to about 1.25% (based on the weight of the gum base) of the candelilla wax is employed with from about 2.75 to about 3.25% (based on the weight of the gum base) of the paraffin wax. The waxes are found to reduce the tackiness of the final gum composition without significantly reducing cohesivity thereof.

The gum base may also include a softening agent and lubricant combination which may comprise one or more hydrogenated vegetable or animal fats (Hydrofol) having a high melting point, that is, above about 22° C., and preferably above about 50° C.; such softening agent and/or lubricant may be employed in amounts ranging from about 0 to about 5% by weight of the gum base, preferably from about 0.5 to about 3%, and optimally from about 1 to about 2%. Examples of softeners suitable for use herein include, but are not limited to, glycerol monostearate, lecithin, coconut oil, fatty acids, such as stearic, oleic and palmitic, partially hydrolyzed polyvinyl esters, waxes, such as carnauba wax, candelilla wax and beeswax wax and cellulose derivatives.

The chewing gum may also contain hydrophilic type plasticizers suitable for use herein, but not limited to partially hydrolyzed polyvinyl acetate, carnauba wax, beeswax, cellulose derivatives, such as methyl cellulose and carboxy methyl cellulose and various hydrophiles, such as propylene glycol and glycerine and combinations of any two or more of the above.

The gum base will also include an emulsifier to impart hydrophilic properties to the gum base so that saliva will be absorbed thereby making the gum base slippery; the emulsifier will be employed in amounts ranging from about 0 to about 10% by weight of the gum base, preferably from about 3 to about 9%, and optimally from about 6 to about 8%. Examples of such emulsifiers include glyceryl monostearate, phosphatides, such as lecithin and cephalin, Tweens, Spans and mixtures thereof.

In addition, the gum base may include colorants, such as titanium dioxide, plasticizers, such as lanolin, stearic acid, sodium stearate, potassium stearate and the like, antioxidants, in an amount up to 1000 ppm of the gum base, such as butylated hydroxyanisole, butylated hydroxytoluene, and propyl gallate.

The chewing gum may also include water in amounts ranging from about 0 to about 6% by weight, and preferably from about 0.5 to about 2.5% by weight, and most preferably, as little water as possible.

The gum base including the built-in air voids is prepared by heating and/or blending the various ingredients as mentioned above as described hereinafter.

As indicated, the chewing gum will include a sugar and/or sugar alcohol sweetener which will be employed in an amount of from about 1 to about 30% by weight, and preferably, from about 15 to about 28% by weight so that the total calorie content of the chewing gum of the invention will be less than 65%, preferably less than 50% and optimally less than 40% of that of conventional sugar containing and sugarless chewing gums.

Examples of sweeteners which may be employed herein include sugars, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose, such as cane or beet sugar, lactose, maltose or cellobiose; polysaccharides, such as partially hydrolyzed starch or dextrin, as well as sugar alcohols, such as sorbitol, mannitol, xylitol, mixtures thereof, as well as hydrogenated starch hydrolysates or isomaltitol, and mixtures of two or more of the above sugars and/or sugar alcohols.

The chewing gum of the invention may also contain an artificial sweetener, such as, for example, aspartame, cyclamate, or a saccharin or other sweetener as set out hereinafter, the artificial sweetener being present in an amount of from about 0 to about 0.5% by weight, and preferably, from about 0.05 to about 0.2% by weight.

Examples of artificial sweeteners which may be employed herein include sodium, calcium or ammonium saccharin salts, dihydrochalcones, glycyrrhizin, dipotassium glycyrrhizin, glycyrrhizic acid ammonium salt, L-aspartyl-L-phenylalanine methyl ester, (aspartame), the sodium or potassium salt of 3,4-dihydro-6-methyl-1,2,3-oxathiazine-4-one-2,2-dioxide (Ace-sulfame-K), as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

Where long-lasting sweetness is desired, the sweetener may be employed in particulate form so as to have an average particle size of less than 150 microns, and preferably less than 100 microns.

As indicated, the chewing gum of the invention may include flavoring, such as sour or fruit flavoring or non-acid or mint flavoring in an amount ranging from about 0.5 to about 2% by weight of the final chewing gum product. The flavoring may comprise synthetic flavors and oils derived from plants, leaves, flowers, fruit, etc. Representative fruit flavor adjuncts include acids, such as adipic, succinic and fumaric acid, and citrus oils, such as lemon oil, orange oil, lime oil, grapefruit oil, and fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewable gum base with or without conventional preservatives.

The chewing gum of the invention including the air voids may be prepared as follows. A standard gum base or bases, comprising approximately 15 to 35% of the total product, is added to a steam jacketed kettle equipped with a sigma blade mixer. The temperature of the kettle is maintained at about 140°-180° F. At this point softener, such as lecithin is added to the base and mixed for several minutes. Filler-texturizer, such as calcium carbonate is then added slowly. The quantity of this finely divided water insoluble material is such that the mixture begins to tear apart, forming discrete pieces of base, emulsifier, finely divided water insoluble, and air. Flavor including sweetener are then added. The plasticizing action of the flavor brings the mass together where it can be removed from the kettle and formed into a desired shape, such as sticks, tablets, blocks and the like.

The following Examples represent preferred embodiments of the invention.

EXAMPLE 1

A chewable gum base having the following composition is prepared as described below.

TABLE I

| CHEWABLE GUM BASE | |
| --- | --- |
| Ingredients | Parts by Weight |
| PVA (polyvinyl acetate) | 5 |
| CaCO$_3$ | 75 |
| SBR copolymer | 2 |
| Arochem | 2 |
| Hydrofol | 1 |
| Candelilla wax | 1 |
| Glyceryl monostearate | 1 |
| Paraffin wax | 3 |
| Stabelite ester No. 5 | 2 |
| BHA | 0.01 |
| Lecithin | 7 |
| Aspartame | 1 |
| Flavor | 1 |

Polyvinyl acetate, styrene-butadiene copolymer, Arochem (glyceryl ester of dimerized rosin), Hydrofol (hydrogenated animal fat), candelilla wax, paraffin wax, glyceryl monostearate, Stabelite ester No. 5 (hydrogenated glyceryl ester of rosin), and BHA (butylated hydroxyanisole) are added to a steam jacketed kettle equipped with a sigma blade mixer. The temperature of the mixer is maintained at 160° F. At this point, lecithin is added and the mix is mixed for several minutes. Calcium carbonate is then added slowly. The mixture beings to tear apart, forming discrete pieces of base and emulsifier, finely divided water-insoluble and air. Flavor and sweetener are then added and mixed for about 1 minute. The plasticizing action of the flavor brings the mass together where it is removed from the kettle and formed into sticks or cubes.

The so-formed chewable gum base of the invention is comprised of about 98.5% gum base, has an almost non-existent calorie content of 0.235 calories per gram (less than one calorie per piece), does not increase in viscosity upon chewing, even in the presence of a dramatic increase in cud volume due to an external hydration. The unexpected cause of this phenomena is the fact that at least 15% air is entrapped in the gum base matrix upon chewing. The air voids become filled with moisture, resulting in the cud volume increase. The absence of water-soluble extractables insures against disintegration and that the basic formula does not change upon chewing.

In order to demonstrate the advantages of the chewable gum base, the chewable gum base prepared as described above is compared with conventional sugarless chewing gum and conventional chewing gum base. The composition of the conventional gum base is outined below.

TABLE II

| TYPICAL CONVENTIONAL GUM BASE | |
| --- | --- |
| Ingredients | Parts by Weight |
| Candelilla wax | 5 |
| Paraffin wax | 13 |
| Polyvinyl acetate | 22 |
| SBR copolymer | 9 |
| CaCO$_3$ | 20 |
| Stabelite ester No. 5 | 11 |
| Arochem | 7 |
| Hydrofol | 7 |
| Glyceryl monostearate | 6 |

Upon examination of the conventional chewing gum, chewable gum base and conventional gum base, the following results are obtained.

Conventional sugarless chewing gum, containing mostly water soluble sweeteners, binders and the like, undergoes a decrease in cud volume from 0 time through 30 minutes. It is normally assumed, however, that almost all of the water solubles are chewed out of the gum after five minutes, leaving only gum base, flavor and perhaps some traces of water solubles. In order to demonstrate the above, cud volumes of the conventional sugarless gum are calculated starting at 5 minutes (no water solubles), 10, 15, and 20 minutes. The result is an overall decrease in cud volume of 8% throughout this period. This indicates loss of volume and no moisture pick up because hydration occurs during processing and not during chewing.

By contrast, cud volumes of the chewable base product of the invention are calculated at 0 time, every 5 minutes to 20 minutes and an increase in volume of over 100% is noted. This indicates a dramatic moisture gain without decomposition.

A complete summary of the similarities and differences between chewing gum, chewing gum base, and chewable gum base are outlined below.

| Mechanism | Conventional Chewing Gum | Invention-Chewable Gum Base | Conventional Gum Base |
|---|---|---|---|
| Ease of chewing | Soft | Soft | Hard |
| Air Content | hydration | 15% | 1.7% |
| Hydration Method | In Kettle | Upon Chewing | No hydraation |
| % Water Solubles | 70–80% | 1.3% | 0% |
| % Volume Change | −8% | +100% | Not chewable |
| Site of Hydration | Mostly hydrophilic | Mostly hydrophobic | Mostly hydrophobic |
| Air Entrapment | Due to finely divided water soluble | Due to finely divided water insoluble | Not applicable |

EXAMPLE 2

A chewing gum having reduced calorie content, in accordance with the present invention, is prepared from the following ingredients:

| Ingredients | Parts by Weight |
|---|---|
| Gum base (as disclosed in Ex. 1) | 78.8 |
| Sugar | 20 |
| Peppermint oil | 1 |
| Free saccharin acid (passes through a U.S. 140 mesh screen) | 0.2 |

The gum base is melted (temperature 270° F.) and placed in a standard dough mixer kettle equipped with sigma blades. The peppermint oil and sugar are added and mixed for 2 minutes at 200° F. At the time the mix is folding well, powdered free saccharin is added and the mixture is mixed for 1 minute at 200°. The resulting gum is discharged from the kettle and is rolled, scored and cut into 3 g cubes which are found to have a pleasant sweet taste and a reduced calorie content of only 27% of that of conventional sugar-containing gum containing 73.6% sugar.

EXAMPLE 3

A sugar-containing chewing gum having reduced calorie content, in accordance with the present invention, is prepared as described below from the following ingredients:

| Ingredients | Parts by Weight |
|---|---|
| Bubble gum base (contains 25% CaCO$_3$ | 24 |
| Lecithin | 6 |
| CaCO$_3$ | 48.5 |
| Peppermint oil | 1.5 |
| Sugar | 20 |

The gum base is melted (temperature 270° F.) and placed in a standard dough mixer kettle equipped with sigma blades and cooled to 180° F. Lecithin and calcium carbonate are added and mixed for one minute; peppermint oil and sugar are then added and mixed for one minute. The gum is discharged from the kettle and is rolled, scored and cut into 3 g sticks or cubes.

The resulting chewing gum product containing 20% sugar is found to have a pleasant sweet taste while having a calorie content of only 2.4 calories per piece as opposed to conventional sugar containing chewing gum containing 73.6% sugar which also has a pleasant sweet taste but contains 8.83 calories per piece. Thus, the sugar containing chewing gum of the invention contains only 27.1% of the calorie content of conventional sugar gum or a 72.9% reduction.

EXAMPLE 4

A sugarless chewing gum having reduced calorie content, in accordance with the present invention, is prepared as described below from the following ingredients:

| Ingredients | Parts by Weight |
|---|---|
| Bubble gum base (contains 25% CaCO$_3$) | 24 |
| Lecithin | 3.5 |
| CaCO$_3$ | 39 |
| Peppermint oil | 1.5 |
| Sodium saccharin | 0.1 |
| Mannitol | 5.4 |
| Sorbitol solution (70% solids) | 19.5 |
| Sorbitol powder | 7 |

The gum base is melted (temperature 270° F.) and placed in a standard dough mixer kettle equipped with sigma blades and cooled to 180° F. Lecithin and calcium carbonate are added and mixed for one minute; peppermint oil and sorbitol solution are then added and mixed for two minutes, mannitol is added and mixed for one minute; and sorbitol powder and saccharin are added and mixed for one minute. The gum is discharged from the kettle and is rolled, scored and cut into 3 g sticks or cubes.

The resulting chewing gum product containing 26.5% sorbitol and 5% mannitol is found to have a pleasant sweet taste while having a calorie content of only 2.8 calories per piece as opposed to conventional sorbitol containing sugarless chewing gum containing 63.4% sorbitol which also has a pleasant sweet taste but contains 7.6 calories per piece. Thus, the sorbitol containing sugarless chewing gum of the invention contains only 36.7% of the calorie content of conventional sugarless gum or a 63.3% reduction.

EXAMPLE 5

A sugarless chewing gum having reduced calorie content, in accordance with the present invention, is prepared as described below from the following ingredients:

| Ingredients | Parts by Weight |
|---|---|
| Bubble gum base (contains 25% CaCO$_3$) | 24 |
| Lecithin | 3.5 |
| CaCO$_3$ | 38 |
| Peppermint oil | 1.5 |
| Water | 6 |
| Mannitol | 5 |

| Ingredients | Parts by Weight |
|---|---|
| Sorbitol | 22 |

The gum base is melted (temperature 270° F.) and placed in a standard dough mixer kettle equipped with sigma blades and cooled to 180° F. Lecithin and calcium carbonate are added and mixed for one minute; peppermint oil and water are then added and mixed for two minutes. The water is added to control air entrapment and resultant cud swelling. The gum is discharged from the kettle and is rolled, scored and cut into 3 g sticks or cubes.

The resulting chewing gum product containing 27% sugar alcohols is found to have a pleasant sweet taste while having a calorie content of only about 3 calories per piece as opposed to conventional sugarless containing chewing gum containing 63.4% sorbitol which also has a pleasant sweet taste but contains 7.6 calories per piece. Thus, the sugarless chewing gum of the invention contains only 39% of the calorie content of conventional sugar gum or a 61% reduction.

What is claimed is:

1. A reduced calorie chewing gum comprising gum base, from about 40 to about 95% by weight of a substantially calorie-free inert filler or texturizing agent dispersed in said gum base, said gum base including at least 10% air voids entrapped in the gum base matrix, which, upon chewing, become filled with moisture, and from about 1 to about 30% by weight of one or more sugars and/or sugar alcohols mixed with said gum base to provide a desirable level of sweetness while keeping the calorie content to only about two-thirds or less of that of conventional chewing gums.

2. The chewing gum as defined in claim 1 further including from about 5 to about 10% by weight of a softener.

3. The chewing gum as defined in claim 1 wherein said sugar is present in an amount of from about 1 to about 30% by weight.

4. The chewing gum as defined in claim 3 wherein said sugar is sucrose, dextrose or fructose or mixtures thereof.

5. The chewing gum as defined in claim 1 wherein said sugar alcohol is present in an amount of from about 1 to about 30% by weight.

6. The chewing gum as defined in claim 1 wherein said sugar alcohol is sorbitol, mannitol, xylitol, hydrogenated starch hydrolysate or isomaltitol or mixtures thereof.

7. The chewing gum as defined in claim 1 wherein said filler or texturizing agent is selected from the group consisting of calcium carbonate, aluminum hydroxide, alumina, magnesium carbonate, talc, aluminum silicates, dicalcium phosphate, magnesium trisilicate, magnesium hydroxide, and mixtures thereof.

8. The chewing gum as defined in claim 7 wherein said filler or texturizing agent is calcium carbonate or alumina or mixtures thereof.

9. The chewing gum as defined in claim 2 wherein said softener is selected from the group consisting of lecithin, coconut oil, fatty acids, glycerol stearate, polyvinyl alcohol, cellulose derivatives and mixtures thereof.

10. The chewing gum as defined in claim 1 further including from about 0 to about 0.5% by weight of a sweetener selected from the group consisting of sodium saccharin, calcium saccharin, ammonium saccharin, the free acid form of saccharin, sodium cyclamate, calcium cyclamate, free cyclamic acid, dihydrochalcones, glycyrrhizin, glycyrrhizic acid ammonium salt, L-aspartyl-L-phenylalanine methyl ester and mixtures thereof.

11. The chewing gum as defined in claim 1 further including additional flavor.

12. The chewing gum as defined in claim 1 wherein said filler or texturizing agent is present in an amount within the range of from about 45 to about 80% by weight of said gum base.

13. The chewing gum base defined in claim 1 including from about 12 to about 18% by weight air voids in said gum base matrix.

14. The chewing gum as defined in claim 1 having a density within the range of from about 1.5 to about 1.75 gm/cc.

15. The chewing gum as defined in claim 1 wherein said chewing gum in sugar-containing form has a calorie content of less than 50% of that of sugar-containing gums of comparable sweetness.

16. The chewing gum as defined in claim 1 wherein said chewing gum in sugarless form has a calorie content of less than 65% of that of sugarless gums of comparable sweetness.

* * * * *